Dec. 19, 1922.

J. W. FAESSLER.
BOILER TOOL.
FILED OCT. 18, 1920.

1,439,622.

INVENTOR
John W. Faessler
By Edward E. Longan
ATTY.

Patented Dec. 19, 1922.

1,439,622

UNITED STATES PATENT OFFICE.

JOHN W FAESSLER, OF MOBERLY, MISSOURI, ASSIGNOR, BY MESNE ASSIGNMENTS, TO THE J. FAESSLER MANUFACTURING COMPANY, OF MOBERLY, MISSOURI, A COPARTNERHIP COMPOSED OF JOHN W. FAESSLER, CHRISTINIA FAESSLER, LOUIS E. FAESSLER, AND GRAVES R. MAUPIN.

BOILER TOOL.

Application filed October 18, 1920. Serial No. 417,722.

*To all whom it may concern:*

Be it known that I, JOHN W. FAESSLER, a citizen of the United States, and a resident of Moberly, Missouri, have invented certain new and useful Improvements in Boiler Tools, of which the following is a specification containing a full, clear, and exact description, references being had to the accompanying drawings, forming a part thereof.

This invention relates to improvements in boiler tools and has for its object a tool designed for rolling the sides of straight holes to any desired degree of angularity and is especially designed for rolling holes in boilers and securing therein wash-out plugs, thimbles, nipples and steam and water connections; heretofore these connections have been secured to the boiler shells by screw threading, but it has been found that these screw threaded surfaces pit very easily and cause leaky connections. By the use of my device the installation of these fixtures are made so tight that pitting or rusting between the two surfaces of the boiler and the connections is eliminated.

Figure 1:
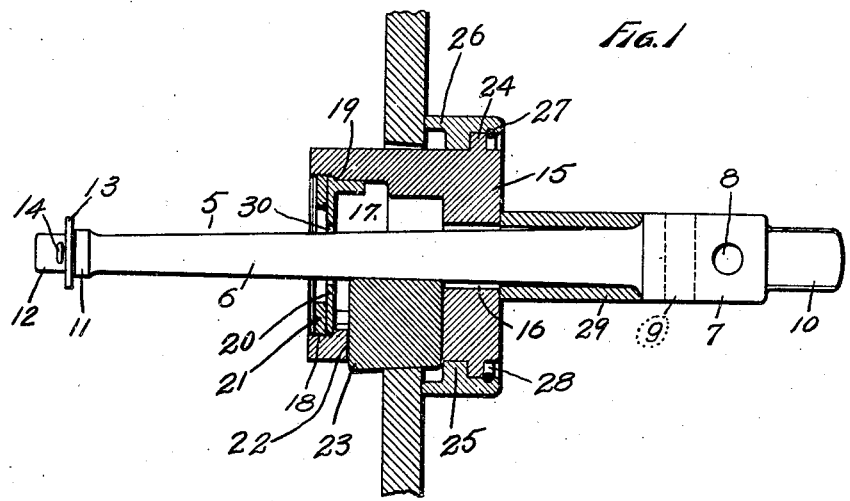
Fig. 1 is a longitudinal, sectional view of my device in position as rolling a straight hole tapered with the mandrel shown in solid.

In the construction of my device I employ a mandrel 5. This mandrel is provided with a tapered surface 6. Adjacent the large end of the tapered surface 6 is a cylindrical portion 7, which is provided with bores 8 and 9. These bores are at rightangles to each other and are for the purpose of permitting the insertion of a bar for rotating the mandrel. Adjacent the cylindrical portion 7 is a square portion 10. This is to allow engagement with a wrench by which the mandrel may be rotated. The small end of the mandrel is provided with an enlargement 11 and with the cylindrical portion 12. This cylindrical portion 12 is of less diameter than the enlargement 11 and over the portion 12 is placed a washer 13, which is held in position by means of a cotter pin 14. Mounted on the tapered portion of the mandrel is a cage 15. This cage is provided with an opening 16 through which the mandrel projects and with the central opening 17. The forward portion of the opening 17 is enlarged and screw threaded as at 18. This screw threaded portion being larger than the opening 17 forms the shoulder 19 against which the roller retainer 20 rests. The roller retainer is secured in position by means of a threaded ring 21 which engages with the screw threads 18. This ring is secured in position by means of a spanner wrench. The periphery of the cage 15 is provided with a plurality of openings 22 through which tapered rollers 23 project. The openings 22 are so arranged that the longitudinal axis of the rollers 23 will be at an angle to the longitudinal axis of the mandrel; the purpose of this is that when the mandrel is rotated in one direction, the rollers will have a tendency to draw the mandrel forward and force the rollers outward from the center of the cage, while rotation in the opposite direction will feed the mandrel backward so that the rollers move toward the center of the cage. The cage is further provided near one end with the flange 24. This flange is adapted to rest against the flange 25 formed in the friction collar 26. The friction collar is also provided with a semi-circular groove 27 in which a split ring 28 is located. The purpose of this ring is to hold the cage 15 and friction collar 26 together. Between the friction collar 26 and the cylindrical portion 9 of the mandrel is interposed a sleeve 29. This sleeve acting as a gage so that uniformity can be attained when making the flaring or tapered holes for various fittings. In Fig. 2 I have shown a device, the structure of which is identical with that shown in Fig. 1, with the exception that the cage is made a trifle longer and the friction collar larger in diameter. This cage and collar are used when rolling the fittings into place, in this instance the nipple for a wash-out plug is shown.

It is obvious that the sleeve 29 can be of any desired length since it is the depth of insertion of the mandrel 5 through the cage which regulates the size of the finished opening; in other words, if a longer sleeve is used the diameter of the finished opening will be less, while with a shorter sleeve the finished opening will be greater.

Figure 2:
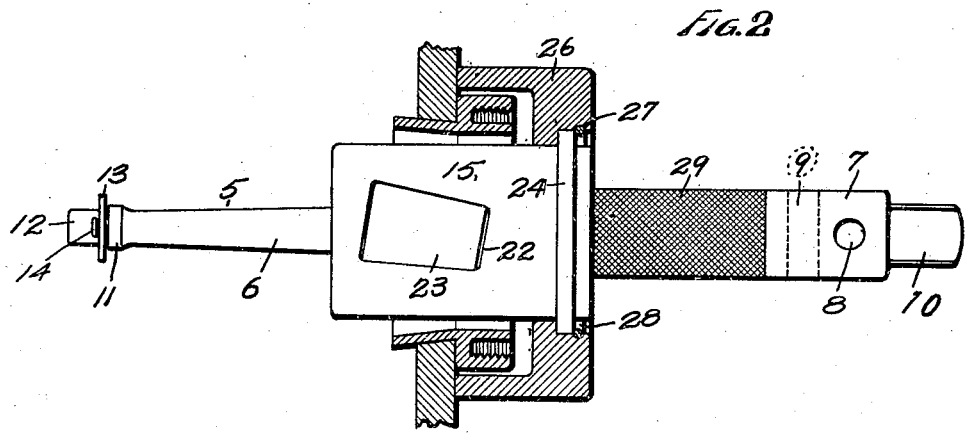
Fig. 2 is a side elevation showing the device rolling in the seat for a wash-out plug with portions in section.
Figure 3:
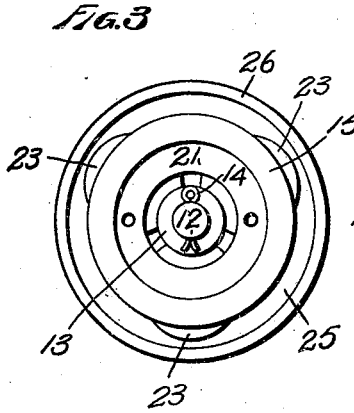
Fig. 3 is an end view of my device viewing the same from the small end of the mandrel.
Figure 4:
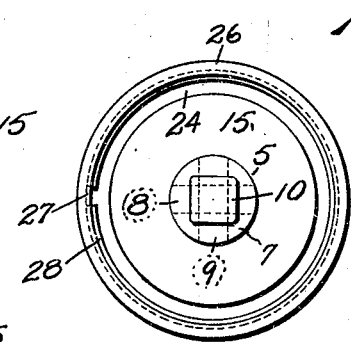
Fig. 4 is a similar view viewing the same from the opposite end.

It will also be noted from Fig. 1 that the roller retainer 20 is provided with a central opening 30. This opening is sufficiently large to allow the mandrel to pass freely therethrough, but not large enough to allow its complete withdrawal; the washer 13 preventing this so that the mandrel and cage together with the sleeve 29 will not become separated. When it is desired to remove the mandrel from the cage for the purpose of changing sleeves, the cotter pin 14 and washer 13 are removed when the mandrel can be withdrawn. The sleeve 29 acts as a gauge and the friction ring 26 will prevent the scoring of the front of the sheet while the holes are being tapered since the cage turns in the friction ring and not the friction ring on the boiler sheet. By eliminating score marks on the boiler sheet it is possible to get a tight connection between the fittings and the face of the boiler sheet.

Having described my invention, what I claim is:

1. A boiler tool comprising a cage, a tapered mandrel extending through said cage, rollers mounted in said cage at an angle to its longitudinal axis and capable of being extended through its outer periphery, a friction collar rotatably mounted on said cage, means carried by the friction collar for holding it on said cage, means carried by the mandrel and adapted to contact with the cage for limiting the movement of the mandrel through said cage, and a roller retainer located within the cage for holding the rollers therein when the mandrel is withdrawn.

2. A boiler tool comprising a cage, a tapered mandrel extending longitudinally therethrough, rollers mounted in said cage at an angle to its longitudinal axis and capable of projecting beyond its outer periphery, a friction collar rotatably mounted on said cage, means carried by the friction collar for securing it to the cage, a sleeve loosely carried by the mandrel, and adapted to contact with the cage for limiting the forward movement of the mandrel, a roller retainer located in the cage for holding the rollers within said cage when the mandrel is withdrawn, and means carried by the mandrel to prevent its accidental withdrawal from the cage.

3. A boiler tool comprising a cage having radial openings formed in its sides, said openings being at an angle to its longitudinal axis, tapered rollers located in said openings, said rollers adapted to be projected beyond the periphery of the cage, an outwardly extending flange formed integral with said cage and adjacent one end thereof, a friction collar having an inwardly projecting flange mounted on said cage, said flange adapted to contact with one face of the flange formed on the cage, means carried by the friction collar and adapted to contact with the flange formed on the cage for holding said collar on said cage, means carried by the mandrel for preventing its accidental removal from the cage, a square end formed on said mandrel, whereby said mandrel can be rotated, and a sleeve carried by said mandrel and contacting with said cage, whereby the forward movement of the mandrel through the cage is limited.

In testimony whereof, I have signed my name to this specification.

JOHN W. FAESSLER.